United States Patent [19]

Fawley

[11] Patent Number: 4,589,562
[45] Date of Patent: May 20, 1986

[54] STRUCTURES REINFORCED BY A COMPOSITE MATERIAL

[76] Inventor: Norman C. Fawley, 255 Rafael Walk, Long Beach, Calif. 90803

[21] Appl. No.: 594,310

[22] Filed: Mar. 28, 1984

Related U.S. Application Data

[63] Continuation-in-part of Ser. No. 260,214, May 4, 1981, abandoned.

[51] Int. Cl.$^4$ .......................... B65D 8/08; F16J 12/00; F16L 9/04; G01K 11/12
[52] U.S. Cl. .......................... 220/3; 138/104; 138/144; 138/153; 138/DIG. 2; 138/DIG. 7; 206/459; 220/83; 220/414; 374/162
[58] Field of Search .......................... 220/3, 83, 414; 206/459; 40/306, 310; 116/217, 206, 207; 374/162; 156/161, 172; 138/129, 143, 144, 153, DIG. 2, DIG. 7; 242/2, 3; 428/394, 395, 918, 913

[56] References Cited

U.S. PATENT DOCUMENTS

| | | | |
|---|---|---|---|
| 2,026,133 | 12/1935 | Mapes | 220/3 |
| 2,055,004 | 9/1936 | Davidson | 374/162 |
| 2,280,501 | 4/1942 | Stephenson | 220/3 |
| 2,401,092 | 5/1946 | Miller et al. | 138/69 |
| 2,490,933 | 12/1949 | Tornquist et al. | 374/162 X |
| 2,718,583 | 9/1955 | Noland et al. | 219/38 |
| 2,824,033 | 2/1958 | Donaldson | 154/83 |
| 3,096,105 | 7/1963 | Risley | 285/286 |
| 3,184,092 | 5/1965 | George | 220/3 |
| 3,240,644 | 3/1966 | Wolff | 220/3 X |
| 3,307,730 | 3/1967 | Davidson | 220/3 |
| 3,349,807 | 10/1967 | Penman | 138/172 |
| 3,374,911 | 3/1968 | White | 40/310 X |
| 3,439,405 | 4/1969 | Berman et al. | 29/421 X |
| 3,457,963 | 7/1969 | Hardwick | 138/172 |
| 3,480,499 | 11/1969 | Paul | 156/175 |
| 3,483,896 | 12/1969 | Grosh | 138/141 |
| 3,486,655 | 12/1969 | Ragettli | 220/3 |
| 3,502,529 | 7/1966 | Borgnolo et al. | 156/172 |
| 3,631,897 | 1/1972 | Fischer et al. | 138/141 |
| 3,651,695 | 3/1972 | Brown | 374/162 X |
| 3,757,829 | 9/1973 | Berry et al. | 138/146 |
| 3,768,269 | 10/1973 | Broussard et al. | 61/72.3 |
| 3,784,441 | 1/1974 | Kaempen | 156/161 X |
| 3,815,773 | 6/1974 | Duvall et al. | 220/3 |
| 3,843,010 | 10/1974 | Morse et al. | 220/3 |
| 3,860,039 | 1/1975 | Ells | 138/103 |
| 3,870,350 | 3/1975 | Loncaric | 285/286 |
| 3,873,139 | 3/1975 | McCabe | 285/286 |
| 3,939,874 | 2/1976 | Gray | 138/145 |
| 3,969,812 | 7/1976 | Beck | 220/3 X |
| 3,977,614 | 8/1976 | Hardwick | 242/2 |
| 4,001,054 | 1/1977 | Makepeace | 148/16.5 |
| 4,014,370 | 3/1977 | McNulty | 138/144 |
| 4,081,303 | 3/1978 | Rogers et al. | 138/129 X |
| 4,106,528 | 8/1978 | Laing | 138/149 |
| 4,148,127 | 4/1979 | Somerville | 138/172 X |
| 4,176,691 | 12/1979 | Jude et al. | 138/103 |
| 4,180,104 | 12/1979 | Park et al. | 138/172 |
| 4,195,669 | 4/1980 | Ives et al. | 138/172 X |
| 4,214,932 | 6/1980 | Van Auken | 156/187 |
| 4,224,966 | 9/1980 | Somerville | 138/172 |
| 4,289,172 | 9/1981 | Ekstrom | 138/149 |
| 4,340,090 | 7/1982 | Matsushita et al. | 138/DIG. 2 |

FOREIGN PATENT DOCUMENTS 3863077 9/1977 Japan .
3944480 10/1980 Japan .

OTHER PUBLICATIONS

Feb. '73, *Journal of Engineering for Industry*, p. 219, "Fracture Resistance of Wire-Wrapped Cylinders", by Shoemaker et al.

*Primary Examiner*—Allan N. Shoap
*Attorney, Agent, or Firm*—Ziems, Walter & Shannon

[57] ABSTRACT

Structures, such as pressure vessels or pipes, for the storage and transportation of fluids under pressure are wrapped with a composite material including a high-strength unidirectional filament material in a matrix of a flexibilized isophthalic polyester resin which has an elongation at least equal to the elongation of the material of the structure. The index of refraction of the resin is matched to the index of refraction of the filament material so that the pressure vessel is visible through the wrapping. The resin discolors when exposed to a heat above which the material of the structure weakens, thus acting as an indicator that the structure is unsuitable for use.

13 Claims, 5 Drawing Figures

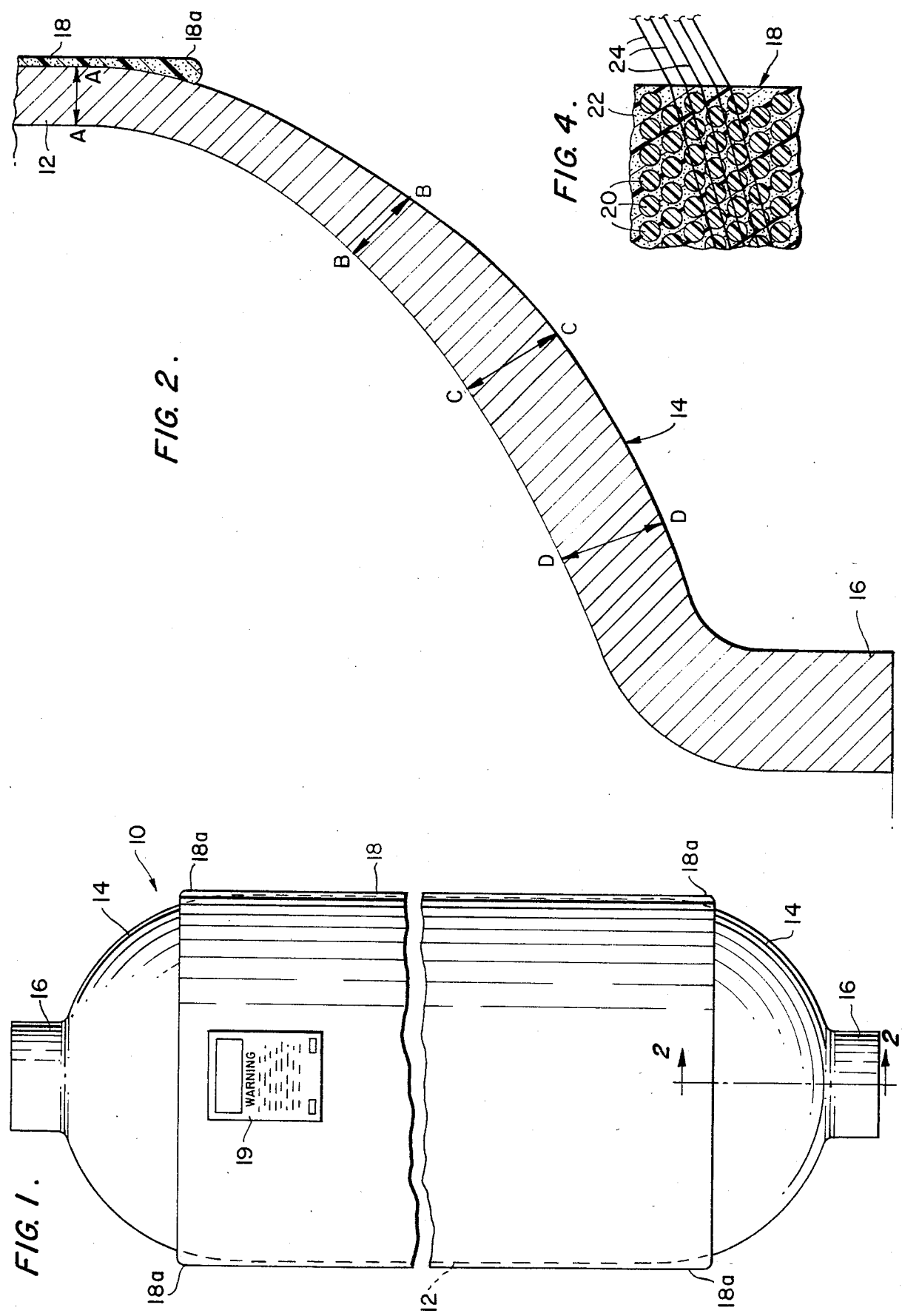

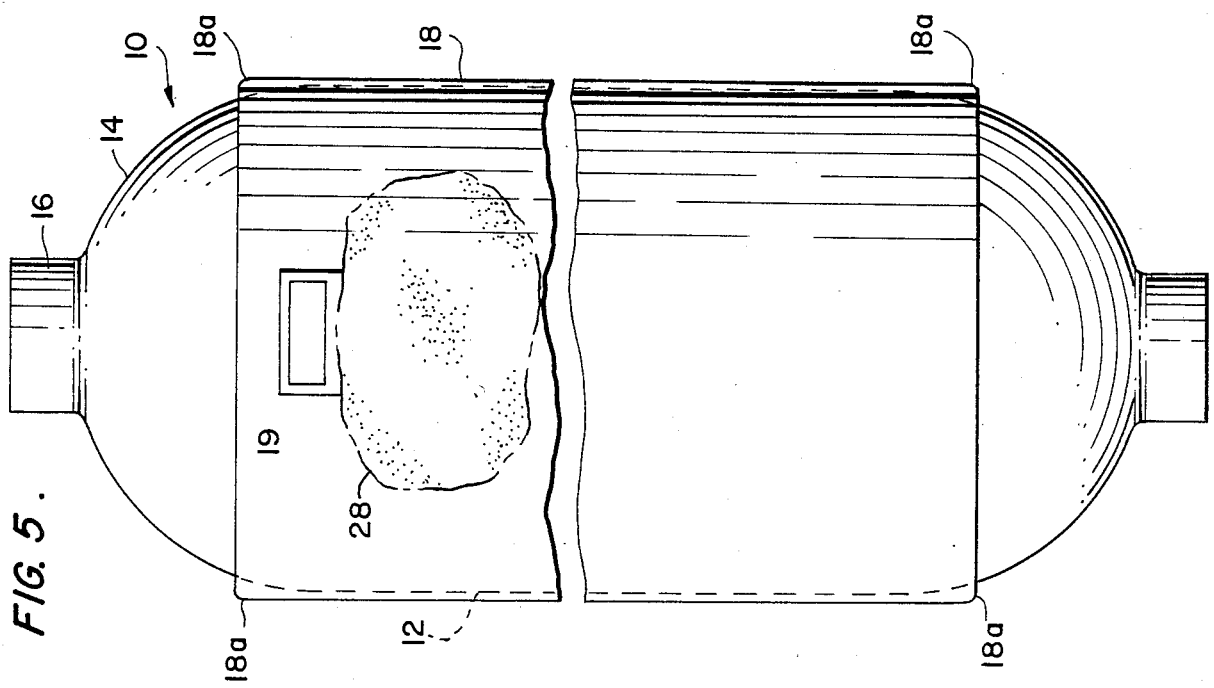
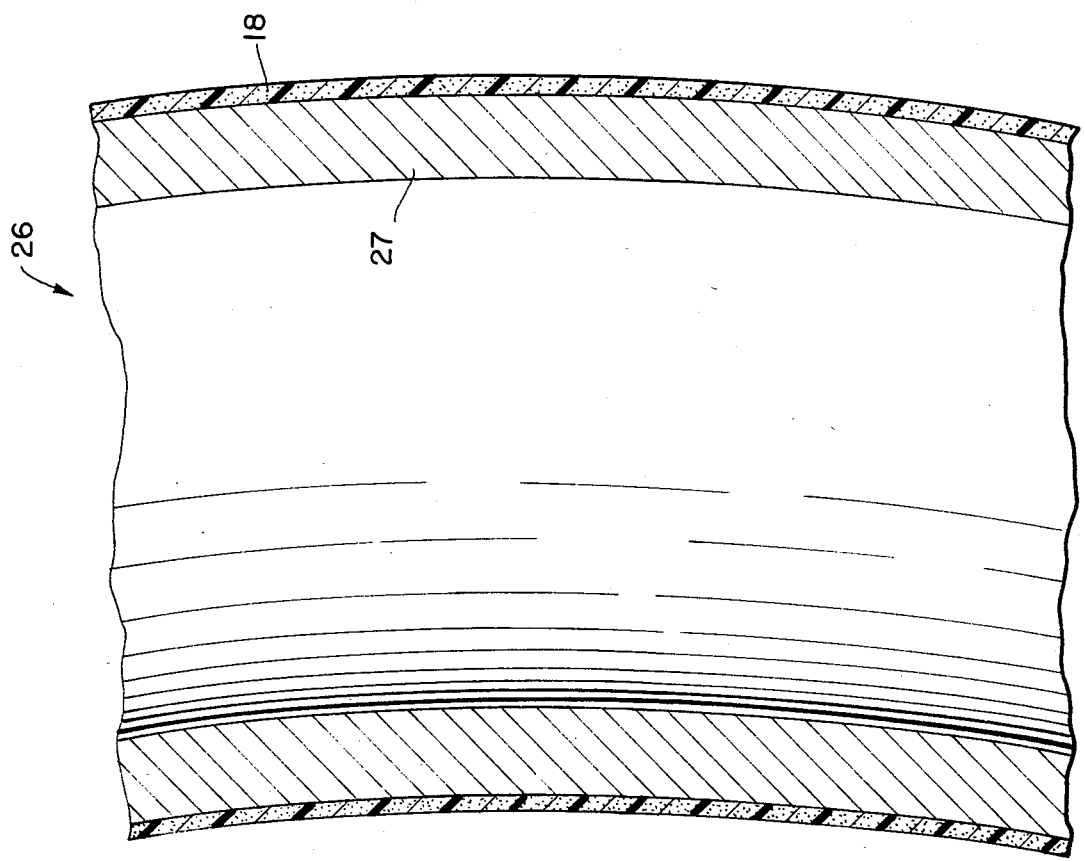

STRUCTURES REINFORCED BY A COMPOSITE MATERIAL

This application is a continuation-in-part of Ser. No. 260,214, filed May 4, 1981, now abandoned.

BACKGROUND OF THE INVENTION

This invention relates to reinforced structures for the storage and transportation of gases, especially hydrogen containing gases, at high pressure and to a method of manufacturing same and, more particularly, to a reinforced pressure vessel which is especially well suited for subjection to repeated cyclic pressurization, such as in use as a fuel tank for vehicles. The invention also relates to reinforced structures such as reinforced pipe.

Pressure vessels have been produced in a wide variety of designs. For example, early designs were fabricated from high tensile strength alloy steels, which resulted in a substantial weight per unit of volume of vessel, and were subject to hydrogen embrittlement. Of course, these types of vessels tended to be unwieldy and, therefore, had a limited application for portable use.

With the advent of impact extruded aluminum, pressure vessels were improved to the extent that an approximate thirty percent weight reduction was achieved over the conventional steel pressure vessels, while providing an extremely high resistance to industrial and marine environments as well as to many corrosive gases, albeit with relatively limited size and capacity. After the aluminum pressure vessel became well-established, further improvements involved the over-winding of the circumference of an inner liner with a composite material, such as a high strength filament material in an epoxy resin or the like.

The overwound liner design exhibited an increased capacity by a significant amount, with a relatively small increase in weight. However, one problem that has prevented widespread use of the overwound vessels in general use applications is their lack of high cyclic fatigue performance, which is often below 30,000 to 40,000 cycles, well below the 100,000 cycles required for general use cylinders by the United States Department of Transportation. The deficiency is due largely to the fact that these vessels are often designed with their longitudinal burst strength being different from their radial, or hoop, burst strength, both before and after the vessel is overwound with the composite material. This variance between the longitudinal and radial burst strengths causes stress imbalances throughout the vessels and, when very high cycles of pressurization and depressurization occur during use, these stress imbalances cause premature failure, particularly in the "knuckle" radius of the base and head, which is required for producing a vessel by impact extrusion.

Also, these types of vessels were often designed with the thickness ratio between the walls of the vessels and the composite being relatively low. As a result, the vessel would be completely overwound with the composite material, and the head configuration of the vessel often was toroispherical or ellipsoidal in order to keep the filament material in place on the heads during the winding operation. However, this further compounded the stress distribution since, in these designs, the stress at the juncture between the side wall and the head is at least two to three times greater than that in a hemispherical head configuration.

Some pressure vessels according to the prior art also have a relatively short length compared to the inside diameter of the vessel. This leads to a problem known as the "end effect" in which resistance to cyclic fatigue is relatively low due to the fact that the head and base stiffness is transferred to the side wall of the vessel.

The prior art pressure vessels which employ high strength filament material in a matrix usually employ the filament material in a matrix of an epoxy resin or an ordinary polyester resin having limited elongation. These resins have a typical elongation of 2% to 3%, whereas the elongation of the cylinder material is considerably greater, for example, usually 10%–25% for aluminum, depending on the type of aluminum and its thickness. Furthermore, where these resins comprise a matrix for high strength filament material, an even lower elongation is exhibited for the composite material of resin and filaments. The publication "Aluminum Standards and Data 1979", published by The Aluminum Association, Incorporated, defines "elongation" as "the percentage increase in distance between two gauge marks that results from stressing the specimen in tension to fracture". This difference is important where the pressure vessel is initially pressurized, as in an autofrettage process, to obtain a pre-tension in the walls of the pressure vessel. In the autofrettage process, the diameter and length of the vessel are increased as a result of internally applied pressure. A substantial expansion of the vessel also occurs in normal use when it is filled with gas under pressure. By "substantial expansion" is meant expansion of more than 3%. Although the elongation characteristics of the material of the vessel are sufficient to accommodate such substantial expansion, the elongation characteristics of the currently used resins, which are chosen primarily for their corrosion resistance properties, are not sufficient. Thus, the resin matrix containing the high strength filaments wound around the pressure vessel fractures or cracks because of the difference between the expansion of the cylinder and the elongation of the resin matrix. The cracking allows moisture and dirt to migrate into the matrix and engage the wall of the vessel, where they remain and cause corrosion.

It can be seen that a similar problem exists for pipes which are reinforced with high strength filaments in a resin matrix and then autofrettaged or bent along their lengths to fit various applications. For example, when pipe is assembled in a pipeline, the pipe must conform to the supporting earth and where the pipe goes over hills or through depressions, the pipe must bend to conform. The portion of the pipe wall on the outside of the bend often undergoes substantial expansion. The previously used resins would fail where the pipe is bent.

Furthermore, currently used resins are opaque, so that any defects or corrosion which would have been visible in an unwrapped vessel are not visible. Moreover, defects in the filaments and in the resin itself below the surface are not visible. Of course, such defects or corrosion would also not be visible in a similarly wrapped pipe. In addition, especially in the case of aluminum pressure vessels or pipes, exposure to excessive heat often results in critical weaknesses in the wall which are not at all visible, even where the wall is visible.

In prior art pressure vessels which were reinforced with nonmetallic filaments, a filament material ordinarily used was fiberglass of the "S-2" type, which is a relatively expensive and which often snarls and breaks during winding. In addition, in prior art overwound pressure vessels which include a resinous matrix, a resin which is commonly used is epoxy resin, which is expensive. Furthermore, the epoxy resins used have a high cure temperature (on the order of 350° F.–450° F.) and a long cure time (5–8 hours). Not only do these cure characteristics give rise to special handling problems and slow the manufacturing process, but where an aluminum structure is involved, they tend to weaken the aluminum because the cure temperature of the resin is in a range where the strength of the aluminum is significantly weakened and is close to the annealling temperature (450° F.–600° F.) of the aluminum. Since aluminum is normally aged at 340° F. for about 8 hours, the cure characteristics of these epoxies can also result in overaging the aluminum, which can radically affect the mechanical properties of the metal. For example, overaging of the metal can cause it to become brittle and thereby fail prematurely. Moreover, epoxy resins present potential health problems and, thus, require special care.

SUMMARY OF THE INVENTION

It is therefore an object of the present invention to provide a large diameter, long length pressure vessel for the storage and transportation of gases, including hydrogen containing gases, and a method of manufacturing same, in which the vessel enjoys a high gas carrying capability and yet can be subjected to a relatively high cyclic pressurization.

It is a further object of the present invention to provide a structure, such as a pressure vessel or pipe, in which the structure is reinforced with a low cost composite material including a high strength unidirectional filament material in a resin matrix.

It is a still further object of the present invention to provide a pressure vessel and a method of manufacturing same of the above type in which the radial burst strength of the vessel is substantially equal to the longitudinal burst strength so as to prevent failure in response to said high cyclic use.

It is a still further object of the present invention to provide a pressure vessel and method of the above type in which the vessel enjoys a relatively light weight and is highly resistant to corrosion.

It is a still further object of the present invention to provide a pressure vessel which makes practical the use of compressed gases as fuel for vehicles.

It is a still further object of the present invention to provide a vessel of the above type in which the wall thickness of the cylindrical portion is at least two times greater than the thickness of the composite overwrap.

It is a still further object of the present invention to provide a vessel of the above type which enjoys a relatively high length-to-inside diameter ratio to avoid the problem of the end effect, discussed above.

It is another object of the present invention to provide a reinforced structure, such as a pressure vessel or pipe, wound with high strength filaments in a resin matrix which does not fail as the result of insufficient resin elongation to accommodate the plastic deformation of the structure due to expansion or bending of the structure.

It is yet another object of the present invention to provide a reinforced structure having a reinforcing winding of high strength filaments in a resin matrix in which defects in the structure are visible through the reinforcing, and defects in the filaments and the matrix itself are visible.

It is still another object of the present invention to provide a reinforced structure for containing fluid under pressure having a mechanism for detecting exposure of the structure to excessive heat.

Toward the fulfillment of these and other objects of the present invention, the method of the present invention for making a pressure vessel comprises the steps of reducing the diameter of the tube-like member at each end thereof to form closed head portions having a wall thickness greater than that of the remaining cylindrical portion. The remaining cylindrical portion is wrapped with a high strength unidirectional filament material in a resin matrix to the extent that the radial burst strength of the vessel so formed substantially equals the longitudinal burst strength so as to prevent failure in response to the cyclic use.

Furthermore, in the reinforced structures according to present invention, the filament material is contained in a matrix comprising a flexibilized isophthalic polyester resin having an elongation at least equal to the elongation of the material of the vessel, pipe or other hollow structure. When this flexibilized isophthalic polyester resin is used, pressure vessels can be pressurized through the autofrettage operation and filled, and pipes can be curved or bent along their length, with no fracturing of the resin whatsoever. The refractive index of the resin is adjusted to match that of the filament material so that the resultant composite reinforcing material is transparent. As a result, any physical damage to the composite material or to the structure underlying the composite material is visible. Any labels or any information stamped in the structure, such as lot numbers and serial numbers, is visible through the composite material. In addition, the resin is adjusted to discolor upon exposure to heat in excess of 400° F., which is just slightly below the temperature at which aluminum weakens substantially or anneals. Therefore, the resin provides an indication when an aluminum structure has been exposed to temperatures which substantially weaken it.

An advantageous filament material is fiberglass of the "E" type which costs about one-fourth as much as the "S-2" types, and which is less likely to snarl and break when being wound around a structure. The flexibilized isophthalic polyester resin which is used in the reinforced structures costs one-half to one-third as much as the epoxy resins and does not give rise to the handling and health problems that epoxy resin does. Moreover, the flexibilized isophthalic polyester resins have a much lower cure temperature (about 150° F.) and a much shorter cure time (about 1½ hours), so that curing them does not weaken or over-age the metal or slow the manufacturing process in the way that curing the epoxy resins does.

BRIEF DESCRIPTION OF THE DRAWINGS

The above description, as well as the objects, features and advantages of the present invention will be more fully appreciated by reference to the following detailed description of a presently preferred but nonetheless illustrative embodiment in accordance with the present invention, when taken in conjunction with the accompanying figures in which:

FIG. 1 is a front elevational view of a reinforced pressure vessel according to the present invention;

FIG. 2 is an enlarged partial cross-sectional view taken along the line 2—2 of FIG. 1;

FIG. 3 is a greately enlarged cross-section of a portion of the composite material of FIG. 1 showing the refraction of incident light;

FIG. 4 is a cross-section of a portion of the wall of a curved reinforced pipe according to the present invention; and FIG. 5 is a front elevational view of a reinforced pressure vessel according to the present invention which has been exposed to excessive heat.

DESCRIPTION OF THE PREFERRED EMBODIMENT

Referring specifically to FIG. 1 of the drawings, the reference numeral 10 refers in general to a pressure vessel formed according to the present invention having a cylindrical portion 12 and two hemispherical end portions, or heads, 14 formed integral with the side wall 12. A pair of necks 16 are formed at the respective ends of the vessel 10 integral with the heads 14. The necks 16 protrude outwardly from the heads 14 and are adapted to accommodate fixtures, such as reducer bushings or the like, for accommodating valves for pressurizing or depressurizing the vessel. A composite material, shown in general by the reference numeral 18, extends over the cylindrical portion 12 and slightly onto a portion of the heads 14 and will be described in detail later. A label 19 which may contain information about the gas in the pressure vessel 10, proper use of the vessel, etc., is positioned between the vessel 10 and the composite material.

In manufacture, a tube, preferably of aluminum, which may be extruded by the die and mandrel method from a hollow billet, is cut to the required length while allowing sufficient extra material for the head and neck forming operation. Each head 14 and neck 16 of the vessel is formed in a conventional manner by heating the tube to about 850° F. and rotating the tube in a hollow chuck while engaging the tube with a standard oscillating, or sweeping, roller which sweeps an arc from an end portion of the side walls toward the center of the tube to form a hemispherical head 14, and then in a longitudinal direction to form the neck 16. The roller is repeatedly returned and advanced toward the chuck, causing the diameters of the end portion to gradually reduce until the end of the head is closed and the neck formed. Due to this reduction in diameter, the head 14 is formed into a hemisphere and the neck 16 into a cylinder, the walls of both of which have an increased thickness, as will be described in detail later. This increased thickness substantially increases the longitudinal and radial burst strength of the vessel in the head area and is sufficient to allow the neck 16 to be threaded to accept a bushing and/or a threaded valve or pressure relief device, as also will be described later.

The other end portion of the vessel 10 is then formed in the same fashion, after which the completed vessel is solution heat-treated and artificially aged to bring the aluminum up to its maximum tensile yield and elongation values. The vessel 10 can then be threaded to accept the bushings, cylinder valve and/or safety release devices (not shown) after which it is cleaned and chucked between centers in a winding machine of any conventional design to apply the overwrap of composite material 18 to the vessel.

The composite material 18 is applied by rotating the vessel 10 and transversely winding onto the vessel, at no perceptible prestress, filaments 20 of a high tensile strength material, such as type "E" fiberglass (see enlarged cross-section of FIG. 4). The filaments 20 are preferably formed in rovings which are wound around the circumference of the cylindrical portion 12 of the vessel 10. These rovings, in turn, are formed by thousands of filaments 20, each filament having a diameter of less than 0.001 of an inch. The winding operation can be performed with a filament winder, or the like, and since it is conventional, it will not be described in any further detail. Where the composite material 18 is used with pipe, individual pipe sections can be rotated like the pressure vessel 1, or the pipe can be stationary and wrapped by conventional machines in which the filament material revolves around the pipe.

As can best be seen from FIG. 4, the filament material is coated with a flexibilized isophthalic polyester resin 22 having a Silene binder which chemically couples the resin 22 to the filaments 20. The resin 22 is available under the tradename NCF HiFlex-2 from NCF Industries of Long Beach, Calif. and under the name Polylite 98-4640 from Reichhold Chemicals, Inc. of White Plains, N.Y. A catalyst, such as $1\frac{1}{2}$% MEK peroxide catalyst, is added to the resin 22 before the resin is applied to the filaments 20, so that the resin 22 gels soon after the composite material is in place on the vessel. This amount of catalyst is based on an ambient temperature of 70° F. For a substantially cooler ambient temperature, additional catalyst may be required, for example, $1\frac{3}{4}$% MEK peroxide catalyst. For warmer temperatures, an inhibitor is used to slow the gelling of the resin 22 after the catalyst is added in order to prevent the resin from gelling before the resin is applied to the filaments 22 or before the composite material 18 is in place on the vessel. For example, at 80° F., 1 to $1\frac{1}{4}$% of a 0.002% solution of hydroquinone in methanol can be added to the resin 22 after the MEK peroxide catalyst is added in order to suitably slow the gelling process. The flexibilized isophthalic polyester resin 22 has over 25% elongation, an elongation in excess of that of the metal. The coating is done in a conventional manner, such as by drawing the filaments 20 through a resin bath or by spraying before the winding operation, to form the composite material 18 of the filaments 20 in a matrix of the flexibilized isophthalic polyester resin 22. The filament material comprises approximately 67%-75% of the composite material 18.

The composite material 18 is wound helically over the entire cylindrical portion 12 of the vessel 10 and slightly onto the area defining the hemispherical heads 14 in a direction substantially perpendicular to the longitudinal axis of the vessel, the helix having a very small pitch. The filaments 20 are wrapped around the vessel under a limited tension, that is, a tension which is less than a wrapping tension which would cause the filaments to break. The composite material 18 is wound to a sufficient thickness so that the hoop (radial) burst strength of the vessel 10 reaches from 95% to 100% of the longitudinal burst strength of the vessel.

After the vessel 10 has been wrapped with the composite material in the foregoing manner, it is wrapped with a non-adhering tape (not shown) which holds the resin in place to prevent sagging until it chemically gels due to, for example, the MEK peroxide catalyst, and is then removed. The resin 22 is then cured in an air furnace or with heat lamps at 135° F.–150° F. for one to two hours, by which it also becomes bonded to the vessel 10. As alternatives, ultraviolet radiation, a catalyst or the like can be used for curing.

When appropriate valves or safety devices are installed in the necks 16, the vessel 10 can be subjected to a conventional autofrettage operation. According to this technique, pressurized fluid is introduced to the vessel 10 so that the stress within the vessel is increased to a point where the yield point of the aluminum is exceeded and the vessel expands, usually on the order of 1%–2% based on its original water volume. The pressure is maintained until the aluminum has permanently yielded sufficiently to cause the composite material 18 to assume a state of tension, with a corresponding compressive load being placed on the yielded metal portions of the vessel 10. Once the pressure is removed, the vessel 10 will spring back to within 1½% to 1% of its original internal volume. Since this technique is well known in the art, it will not be described in any further detail. The completed vessel 10 then can be subjected to hydrostatic testing as desired or required before being placed in service.

FIG. 2 depicts the particular configuration of a hemispherical head 14 formed on one end of the vessel 10 and, more particularly, depicts the increasing thickness along the wall of the head 14 from the cylindrical portion to the neck 16 as a result of the aforementioned rolling technique. As an example of the distances shown, the cylindrical portion 12 has a diameter of 13 inches and a wall thickness of 0.500 inches at the line A—A. The thickness at section B—B is 0.625 inches, at section C—C, 0.800 inches, and at D—D, 0.925 inches. As mentioned above, this increasing thickness in the wall of each head 14 as it progresses from its corresponding cylindrical portion 12 to its neck portion 16 results in an increased vessel strength in the longitudinal direction. In the example shown, the composite material 18 has a thickness of approximately 0.2 inches along a majority of its length and a slightly increased thickness at its end portions, as shown by the reference numeral 18a, to avoid any hinge effect between the respective walls of the heads 14 and the cylindrical portion 12. This increased thickness at the end portions 18a of the composite material 18 can be achieved in the aforementioned winding process by causing the feed eye on the filament winder to pause, or dwell, for an appropriate time, which thus increases the amount of filament 20 wound onto the end portions 18a.

The addition of the composite material 18 to the cylindrical portion (and a portion of the heads) increases the burst strength in the radial direction to a value substantially equaling the longitudinal burst strength, which itself is relatively high, as discussed above. Thus, the resulting reinforced pressure vessel enjoys an increased burst strength throughout and behaves as a sphere, with no stress imbalances at any point along the vessel.

Although not clear from the drawing, it is understood that the length of the vessel 10 would be in the neighborhood of 4–30 times greater than the diameter of the cylindrical portion 12 to avoid the problem of the end effect, as discussed above. For example, the vessel 10 discussed above could have a length of approximately 240 inches. Of course, the particular dimensions set forth above have been given by way of example only and can be varied without departing from the scope of the invention.

Since the flexibilized isophthalic polyester resin 22 bonds to the pressure vessel 10 when the resin 22 is cured, it moves with the pressure vessel 10 when the pressure vessel 10 expands during an autofrettage process or during filling in normal use. The flexibilized isophthalic polyester resin 22 can accommodate the expansion without cracking or separation, because the elongation of the resin 22 exceeds the expansion of the pressure vessel 10, and even exceeds the elongation of the material of which the pressure vessel 10 is made. Therefore, crevices which allow dirt and mositure to enter the overwrapping and corrode the pressure vessel 10 are avoided.

The filaments 20 are made of a material, such as fiberglass, which is very light yet has a high tensile strength. The aluminum tube and the resin 22 are also light, and the pressure vessel 10 can withstand a high number of cycles of pressurization and depressurization. As a result, the pressure vessel 10 is small enough and light enough to be used as a fuel tank in a vehicle. In addition, the pressure vessel 10 can withstand pressures sufficient to contain an amount of gaseous fuel which will provide the vehicle with a fairly long range on a single tank of fuel.

As can be seen from the cross-section of FIG. 3, a pipe 26 can also be reinforced by winding the composite material 18 so that the filaments are substantially perpendicular to the longitudinal axis of the pipe, in the manner described in connection with the pressure vessel 10, except that the thickened end portions 18a are not necessary. Pipes wound with the composite material 18 can be curved or bent along their length, as shown by the pipe 26 in FIG. 3, to fit various applications, such as pipelines which must conform to hills and valleys. The portion of a wall 27 of the pipe 26 on the outside of the curve undergoes expansion, with the expansion increasing for tighter curves. Since the flexibilized isophthalic polyester resin 22 has an elongation of more than 25%, it can accommodate the expansion of the pipe wall 27 on the outside of the curve without cracking or otherwise failing. The elongation of pipe materials, such as approximately 10%–25% for aluminum, is less than the elongation of the resin 22. Thus, the pipe material would fail as the result of bending the pipe 26 before the resin 22 would fail.

The high strength unidirectional filament material is transparent fiberglass, and the flexibilized isophthalic polyester resin 22 is also transparent. However, it shoud be noted that a plurality of layers of such fiberglass filaments by themselves are not transparent. It is believed that this is due to the fact that there is air between adjacent filaments, and that the refractive index of air is substantially different from the refractive index of the fiberglass. As a result, there are numerous refractions and reflections in incident light rays trying to penetrate the filaments. Thus, the light rays are prevented from getting through. Similarly, where a resin matrix is used with the fiberglass filaments, even if the resin matrix is transparent by itself, the composite material is not transparent because the index of refraction of the resin matrix is not equal to the index of refraction of the fiberglass. In contrast, as can be seen from FIG. 4, when the filaments 20 are contained in a matrix of the resin 22, and the spaces between the filaments 20 are filled with the resin, and the refractive index of the resin 22 substantially equals the refractive index of the fiberglass filaments 22, then, the incident light rays 24 do not bend each time they travel from the resin 22 to a filament 20 and vice versa. The light rays 24 are refracted in going from the air into the portion of the resin 22 defining the outer surface of the composite material 18, but there is not significant refraction of the rays after they enter the composite material. For example, the refractive index of type 2079 fiberglass produced by PPG Industries, which is suitable for the filaments 20, is 1.549. Therefore, the index of refraction of the flexibilized isophthalic polyester resin is adjusted to approximately equal the index of refraction of the fiberglass, in this case 1.549. Thus, for example, the index of refraction of the NCF HiFlex-2 resin can be adjusted by making a cast of the resin, taking a reading of the index in a refractometer, and by adding or subtracting styrene monomer to the next batch of resin to raise or lower its index of refraction to 1.549. Therefore, when the adjusted resin 22 is used as a matrix for the filaments 22, the resultant composite material 18 is transparent, and the pressure vessel 10 and the label 19 are visible through the composite material.

Furthermore, the oomposition of the resin can be varied slightly so that the discoloration occurs at different temperatures. The flexibilized isophthalic polyester resin 22 discolors when it is exposed to heat in excess of 400° F. For example, it turns brown, black or charred. FIG. 5 represents a reinforced pressure vessel 10, like that of FIG. 1, which has been exposed in one area 28 to temperatures above 400° F. The resin 22 in the exposed area 28 has discolored, thereby indicating that the pressure vessel has been exposed to such temperatures and is, thus, weakened and not suitable for further use.

The temperature of 400° F. was chosen for the resin 22 to discolor, because 400° F. is a temperature above which aluminum, the material of the pressure vessel 10 in the present example, weakens rapidly and substantially. The temperature at which the resin 22 discolors is adjusted by adding aniline to the liquid resin before impregnating the filaments 22. By adding aniline, the discoloration temperature of the NCF HiFlex-2 resin of the present example can be lowered to as far as 350° F. It is understood that other suitable resins may turn other colors upon exposure to temperatures above other selected predetermined temperatures.

A latitude of modification, change and substitution is intended in the foregoing disclosure and in some instances some features. Accordingly, it is appropriate that the appended claims be construed broadly and in a manner consistent with the spirit and scope of the invention therein.

What is claimed is:

1. A reinforced structure for containing fluid under pressure, comprising:
    an elongated hollow member and a band of continuous, high tensile strength fibers in a resin matrix engaging and encompassing the member, wherein the fibers have a predetermined index of refraction and the resin matrix has an index of refraction substantially equal to the index of refraction of the fibers, whereby the elongated hollow member is visible through the band.

2. The reinforced structure of claim 1, wherein the fibers are glass fibers.

3. The reinforced structure of claim 1, wherein the resin is a flexibilized isophthalic polyester resin.

4. The reinforced structure of claim 1, wherein at least a portion of the structure undergoes substantial expansion, and the resin has an elongation sufficient to undergo said expansion without failing.

5. The reinforced structure of claim 1, wherein a label is positioned between the elongated hollow member and the band, whereby the label is visible through the band.

6. The reinforced structure of claim 1, wherein the elongated hollow member is a pressure vessel.

7. The reinforced structure of claim 1, wherein the elongated hollow member is a pipe.

8. A structure for containing fluid under pressure comprising:
    an elongated hollow member and means for reinforcing said elongated hollow member, said reinforcing means comprising a reinforcing band extending around and in engagement with said elongated hollow member and including a plurality of high tensile strength fibers and a matrix encapsulating said fibers, said matrix comprising a heat indicating material responsive, by changing color, to a temperature above which the strength of said hollow member is substantially weakened, thereby indicating that the structure is unsuitable for use.

9. The structure of claim 8, wherein the heat indicating material is a flexibilized isophthalic polyester resin.

10. The structure of claim 8, wherein the elongated hollow member is adapted to undergo substantial expansion and the heat indicating material has an elongation sufficient to undergo said expansion without failing, said band being bonded to the member.

11. The structure of claim 8, wherein the high tensile strength fibers have a predetermined index of refraction, and the heat indicating material has an index of refraction substantially equal to the index of refraction of the fibers, whereby the elongated hollow member is visible through the band.

12. The structure of claim 8, wherein the elongated hollow member is a pressure vessel.

13. The structure of claim 8, wherein the elongated hollow member is a pipe.

* * * * *